United States Patent [19]

Shevada

[11] 4,372,024

[45] Feb. 8, 1983

[54] BEARING PUSHER

[76] Inventor: Mike Shevada, 2856 Yellow Pine Dr., Jacksonville, Fla. 32211

[21] Appl. No.: 270,770

[22] Filed: Jun. 5, 1981

[51] Int. Cl.[3] .......... B23P 19/04

[52] U.S. Cl. .......... 29/260

[58] Field of Search .......... 29/256, 258, 259, 260, 29/263, 266, 251, 252, 255, 254

[56] References Cited

U.S. PATENT DOCUMENTS

| | | | |
|---|---|---|---|
| 2,288,906 | 7/1942 | Kaplan | 29/260 |
| 2,861,330 | 11/1958 | Kratz | 29/254 |

*Primary Examiner*—Robert C. Watson

*Attorney, Agent, or Firm*—John L. Gray

[57] ABSTRACT

A bearing pusher for a squirrel cage blower, typically used in an air conditioning or hot air furnace installation, which enables the bearing to be removed quickly and easily with a minimum of effort and which comprises a pusher portion and a puller portion wherein the pusher portion comprises two complementary members which may be joined together to provide a centrally disposed hollow cylindrical portion adapted to surround a shaft and to provide slots to engage the puller portion and which extends beyond the slots along the axis of said shaft a distance which is slightly greater than the thickness of the bearing to be pushed so that the puller portion when engaged with the pusher portion may be so positioned as to readily remove said bearing from said shaft.

5 Claims, 3 Drawing Figures

BEARING PUSHER

BACKGROUND OF THE INVENTION

Squirrel cage blowers are commonly used in air conditioning and furnace applications, in residential, commercial, and industrial applications. The squirrel cage blower is supported on a shaft which is in turn supported on each end in a bearing which is housed in a mounting usually attached to the blower housing. Normal wear of these devices which sometimes rotate continuously for months at a time, results in the need for eventual replacement of the bearing.

The compact configuration of the shaft and bearing and bearing housing, and the supports for the bearing housing which are attached to the blower housing, make it extremely awkward and difficult to remove the bearing since the bearing must be removed by pushing outwardly along the shaft from inside the squirrel cage blower itself. Conventional bearing pullers such as shown in U.S. Pat. No. 2,789,343, Millsap, U.S. Pat. No. 3,883,941, Coil, and U.S. Pat. No. 3,174,218, McConaha, and devices for removing squirrel cage blower parts such as U.S. Pat. No. 3,393,442, Brewer, and U.S. Pat. No. 4,077,103, Kelley, are not satisfactory and will not function for this purpose.

SUMMARY OF THE INVENTION

The object invention is directed to a unique tool which is particularly suited to the removal of the bearing from a blower shaft, such as a squirrel cage blower, where it is very difficult to have access to the rear of the bearing in order to remove same. The invention is directed to a bearing pusher and involves two separate elements: a pusher portion and a bearing puller portion. The pusher portion is slidably positioned on the shaft and drawn forward into engagement with the bearing by means of the bearing puller and pull bolts.

It is therefore an object of this invention to provide a bearing pusher which will permit the removal of a bearing from a blower shaft from inside the blower itself.

It is a further object of this invention to provide such a bearing pusher which is simple to operate and which is inexpensive and which may be used very quickly to remove such a bearing.

Additional objects and advantages of the present invention will become more readily apparent to those skilled in the art when the following general statements and descriptions are read in the light of the appended drawing.

DETAILED DESCRIPTION OF THE INVENTION

Figure 1:
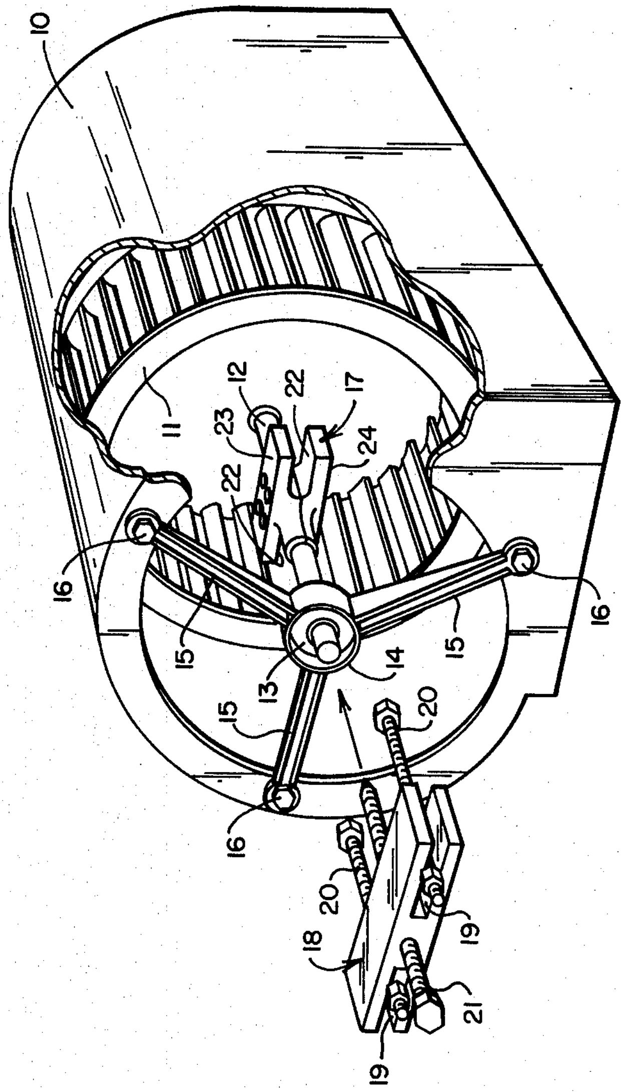
FIG. 1 is a perspective view of a typical squirrel cage blower mounted in a blower housing, with the housing partially removed so as to enable the internal portions to be observed and with the pusher portion of the bearing pusher in place and with the bearing puller and pull bolts in position to be engaged.
Figure 3:
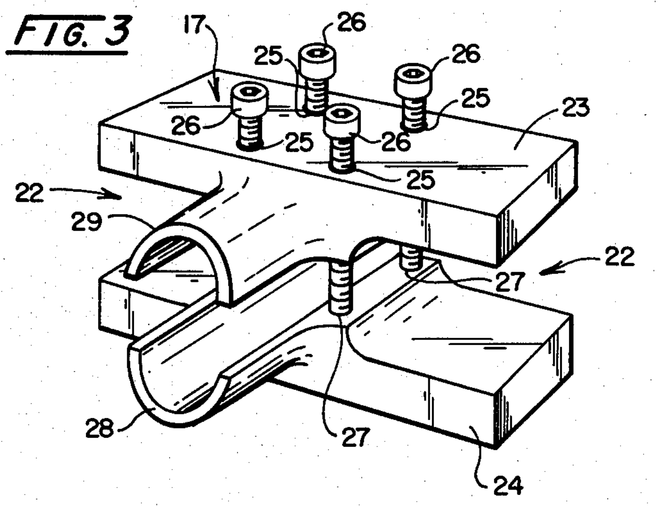
FIG. 3 is a perspective view of the bearing pusher portion of the bearing pusher tool partially disassembled.

Referring now more particularly to FIG. 1, a blower housing is shown at 10 which contains a squirrel cage blower 11 mounted on a shaft 12 which is supported in bearing 13. The opposite end of the shaft 12 (not shown) is supported in a similar bearing and the shaft 12 may be provided with a pulley wheel connected to an electric driving motor. The bearing 13 is supported in a bearing housing 14 which is supported by legs 15—15 attached to the blower housing 10 by appropriate bolts 16—16. The pusher portion of the bearing pusher is shown at 17 and the bearing puller and pull bolts portion of the bearing pusher is shown at 18. The puller portion 18 is provided with slots 19—19 in which adjustable bolts 20—20 may be placed. Central bolt 21 threadedly engages puller portion 18 through the center thereof. Bolts 20—20 are adapted to engage in corresponding slots 22—22 of the pusher portion 17. The structure of the pusher portion 17 of the bearing pusher will be more apparent by reference to FIG. 3. The pusher portion 17 actually comprises an upper member 23 and a lower member 24 provided with corresponding holes 25—25 which are adapted to receive the cap screws 26—26. The corresponding holes 27—27 in the lower member 24 are threaded so that the cap screws 26—26 will threadedly engage the lower member 24 but may move freely in holes 25—25. The center portion 28 of the lower member 24 and the center portion 29 of the upper member 23 are of a size and shape to surround the shaft 12 and slidably engage the shaft 12 when cap screws 26—26 are inserted through holes 25—25 and are threadedly tightened in holes 27—27, thus bringing upper member 23 and lower member 24 into contact.

Figure 2:
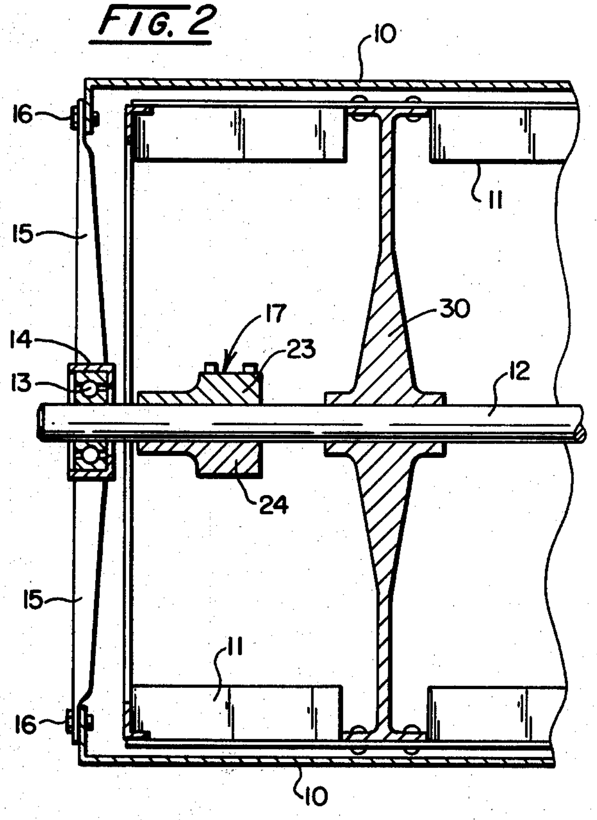
FIG. 2 is a partial side elevation section view on the section 2—2 of FIG. 1.

Referring now more particularly to FIG. 2, the blower 11 is supported on shaft 12 by the web 30 and is journaled in bearing 13 which is held in bearing housing 14 which in turn is connected to the blower housing 10 by arms 15—15 and bolts 16—16. The pusher portion 17 of the bearing pusher is shown in section.

In operation the pusher portion 17 of the bearing pusher is disassembled and the lower member 24 is placed inside the lower housing underneath the shaft 12 in engagement therewith. The upper member 23 of the pusher portion 17 is placed on the upper portion of the shaft 12 with the holes 25—25 in alignment with the holes 27—27 and the cap screws 26—26 are threadedly engaged with the holes 27—27 so that the upper and lower members 23 and 24 are firmly attached to each other but free to slidably move on shaft 12. The puller portion 18 is then placed at the end of the shaft 12 with the pull bolts 20—20 positioned in slots 22—22 on the pusher portion 17 and in slots 19—19 of the puller portion 18. The threaded bolt 21 is backed out so that it doesn't extend beyond the inner edge of the puller portion 18 and the pull bolts 20—20 may be snugged up so that the pusher portion 17 is tightly adjacent to the back of the bearing 12 and the central bolt 21 is in contact with the end of the shaft 12 as shown by the arrow. The central bolt 21 is then tightened forcing the pusher portion 17 of the bearing pusher to move the bearing 13 outward on the shaft until it becomes disengaged therefrom.

A variety of pusher portions 17—17 to accommodate different diameter shafts may be utilized with the same puller portion 18 so that the pool is versatile and useful in removing the bearing from a variety of different size blower shafts from the smallest residential to the largest industrial or commercial air conditioner or furnace.

While this invention has been described in its preferred embodiment, it is to be appreciated that variations therefrom may be made without departing from the true scope and spirit of the invention.

What is claimed is:

1. A bearing pusher comprising a pusher portion and a puller portion,
   said pusher portion comprising two complementary members,
   means for removably joining said members together, said members when joined together providing a centrally disposed hollow cylindrical portion adapted to surround a shaft and two spaced parallel slots co-planar with the axis of said cylindrical portion, said centrally disposed cylindrical portion extending beyond said slots along the axis of said cylindrical portion a distance which is slightly greater than the thickness of the bearing to be pushed, said puller portion comprising a parallelepiped provided with parallel slots extending inwardly from its two opposite smallest faces and a threaded opening centrally disposed in said parallelepiped and parallel to said slots,
   a bolt threaded positioned in said threaded opening and
   two bolts provided with nuts on each end thereof adapted to fit in the slots of said puller portion and the slots of said pusher portion.

2. The bearing pusher of claim 1 wherein said complimentary members are each provided with a centrally disposed hollow semi-cylindrical portion extending from the front to the back of said member.

3. The bearing pusher of claim 1 wherein said means for removably joining said members together comprises a plurality of threaded bolts.

4. The bearing puller of claim 3 wherein one of said members is provided with threaded holes adapted threadedly to engage said threaded bolts.

5. The bearing pusher of claim 2 wherein said centrally disposed hollow semi-cylindrical portion of each of said members projects a distance from said member approximately equal to the distance from the front to the back of said member.

* * * * *

UNITED STATES PATENT AND TRADEMARK OFFICE

CERTIFICATE OF CORRECTION

PATENT NO. : 4,372,024

DATED : February 8, 1983

INVENTOR(S) : Mike Shevada

It is certified that error appears in the above-identified patent and that said Letters Patent is hereby corrected as shown below:

Column 1, line 29, "object" should read -- subject --.

Column 2, line 63, "pool" should read -- tool --.

Signed and Sealed this

*Twelfth* Day of *April 1983*

[SEAL]

*Attest:*

GERALD J. MOSSINGHOFF

*Attesting Officer* *Commissioner of Patents and Trademarks*